United States Patent [19]
Schonberg et al.

[11] Patent Number: 5,744,811
[45] Date of Patent: Apr. 28, 1998

[54] TRANSPORTABLE ELECTRON BEAM SYSTEM AND METHOD

[75] Inventors: Peter R. Schonberg, Scotts Valley; George G. Hoberg, Atherton; Russell George Schonberg, Los Altos Hills; David Richard Fadness, San Jose, all of Calif.; Guy E. Materi, Manchester, Tenn.

[73] Assignee: Zapit Technology, Inc., Santa Clara, Calif.

[21] Appl. No.: 323,636

[22] Filed: Oct. 17, 1994

Related U.S. Application Data

[63] Continuation of Ser. No. 992,614, Dec. 18, 1992, Pat. No. 5,357,291, which is a continuation-in-part of Ser. No. 941,788, Sep. 8, 1992, Pat. No. 5,319,211.

[51] Int. Cl.⁶ ............................................. H01J 37/00
[52] U.S. Cl. ................. 250/492.3; 250/435; 204/157.44; 422/186
[58] Field of Search .......................... 250/492.3, 432, 250/435; 204/157.15, 157.44, 157.3; 422/186

[56] References Cited

U.S. PATENT DOCUMENTS

| | | | |
|---|---|---|---|
| 5,319,211 | 6/1994 | Matthews et al. | 250/492.3 |
| 5,357,291 | 10/1994 | Schonberg et al. | 250/492.3 |
| 5,378,898 | 1/1995 | Schnoberg et al. | 250/492.3 |

*Primary Examiner*—Jack I. Berman
*Attorney, Agent, or Firm*—Stanley Z. Cole

[57] ABSTRACT

The invention is a transportable and reconfigurable system and method designed for on-site conversion of toxic substances to nontoxic forms. The invention includes an electron beam generator, a reaction chamber and effluent post-processing modules mounted on a carrier for transporting the system from site to site.

18 Claims, 3 Drawing Sheets

TRANSPORTABLE ELECTRON BEAM SYSTEM AND METHOD

This is a continuation application of application Ser. No. 07/992,614, filed Dec. 18, 1992 which issued as U.S. Pat. No. 5,357,291 on Oct. 18, 1994, and which is a continuation in part of application Ser. No. 07/941,788, filed Aug. 8, 1992 which issued as U.S. Pat. No. 5,319,211 on Jun. 7, 1994.

BACKGROUND OF THE INVENTION

This invention relates generally to the processing and/or chemical conversion of gases, vapors, aerosols, and suspended particulates using electron beams. These terms are used interchangeably herein and it should therefore be understood that if the word gas is used in the specification or the claims, it is intended to mean gas or gases, vapor or vapors, aerosol or aerosols and suspended particulates. In particular, this invention relates to a transportable system for the conversion of toxic waste, especially volatile organic compounds, to environmentally acceptable compounds or elements.

As products and by-products of industrial processes, toxic organic compounds contaminate our air, soil, and groundwater. Industrial processes continue to generate toxic organic compounds, thereby adding to the existing contamination. Toxics created by incinerators, rotary kilns and bioreactors are also major sources of contamination. Recognition of this problem has led to the development of diverse extraction, collection, and disposal methods to reverse the effects of past contamination and to reduce future contamination of the environment.

Air stripping and vacuum extraction are dispersion technologies which extract contaminants from soil and groundwater. However, venting contaminants directly to the atmosphere is environmentally undesirable. Processing of the contaminants before release or disposal is required and is addressed by this invention, as discussed below.

Carbon containment is a collection technology in which contaminants are passed through carbon (or other adsorbent) filled canisters to adsorb the contaminants. In remediation systems for removal of volatile organic compounds from soil and groundwater, contaminants may be removed from the ground or groundwater by vacuum extraction or air stripped. In effluent treatment systems typically found at refineries or chemical plants, the contaminants may be the discharge of an industrial process. In these various systems, volatile organic contaminants are adsorbed onto carbon, while the remaining portion of the extracted air, steam, or process effluent is released to the environment along with any contaminants the carbon fails to remove. Carbon canisters with adsorbed toxics pose a disposal problem of their own, which is further complicated by the transport problem to move canisters to a treatment facility. In addition, containment of the adsorbed toxics, whether kept in a single location or moved, is not universally effective, as some volatile organic compounds and other pollutants have low adsorptivity.

Incineration is a technique used to destroy contaminants through high-temperature burning. As with carbon containment systems, the vapors may come from vacuum extraction wells, air strippers, or industrial process effluent. Destruction of these contaminants by incineration is often incomplete, however, and incomplete destruction can be expected to produce (and release to the atmosphere) compounds more hazardous than the original contaminants. Furthermore, incineration is often undesirable at refineries and chemical plants because of the dangers presented by the proximity of flammable substances to the incinerator's high temperatures. Moreover, and clearly in populated areas, incineration is politically and socially undesirable.

SUMMARY OF THE INVENTION

Electron beams are used to process or convert toxic and nontoxic compounds to different compounds or elements. Influents consisting of gases, aerosols, and/or suspended particulates enter a reaction chamber (or transformation plenum) into which a beam of electrons is injected. These electrons interact with the influent to chemically transform compounds into elements or other compounds.

Electron beams have previously been used to reduce emissions of sulfur oxides ($SO_x$) and/or nitrogen oxides ($NO_x$) from conventional power plant facilities. Each power plant effluent treatment system is designed to operate with a single power plant. These systems are stationary and permanently fixed in one place. They are not transportable. Moreover, since the composition of a power plant's effluent is relatively unchanging, prior-art effluent treatment systems were not designed to be easily reconfigured.

Electron beam radiation has also been used to convert organic contaminants in drinking water to nontoxic forms. Like the power plant effluent treatment systems, however, water treatment facilities are not designed to be transportable. Rather, prior-art electron beam water treatment systems are designed to meet the requirements of a single water treatment plant. Thus, the prior art does not address the problems of transportability of an electron beam system from site to site or the adaptability of the system to the needs of each particular site.

The invention described herein is a transportable and reconfigurable electron beam conversion system. In the preferred embodiment, an electron beam generator and a reaction chamber are mounted on a trailer (or other vehicle) along with any influent preprocessing modules (such as particulate filters, moisture traps, heaters, coolers, pumps, orifices, nozzles, and/or valves), effluent post-processing modules (such as a carbon canister and a caustic scrubber for hydrochloric acid) and system instrumentation and controls. Influent gases from a vacuum extraction system or other source are fed to the system, and any undesirable compounds in the gases are either transformed to benign elements or compounds or are removed (or further transformed) by the effluent treatment modules. The system may be moved from site to site and is designed to meet all applicable highway weight and size restrictions. In addition, the system's elements are easily reconfigured to meet the specific requirements of each toxic waste site.

The invention is described in more detail below with reference to the drawings.

DETAILED DESCRIPTION OF THE PREFERRED EMBODIMENT

Figure 1:
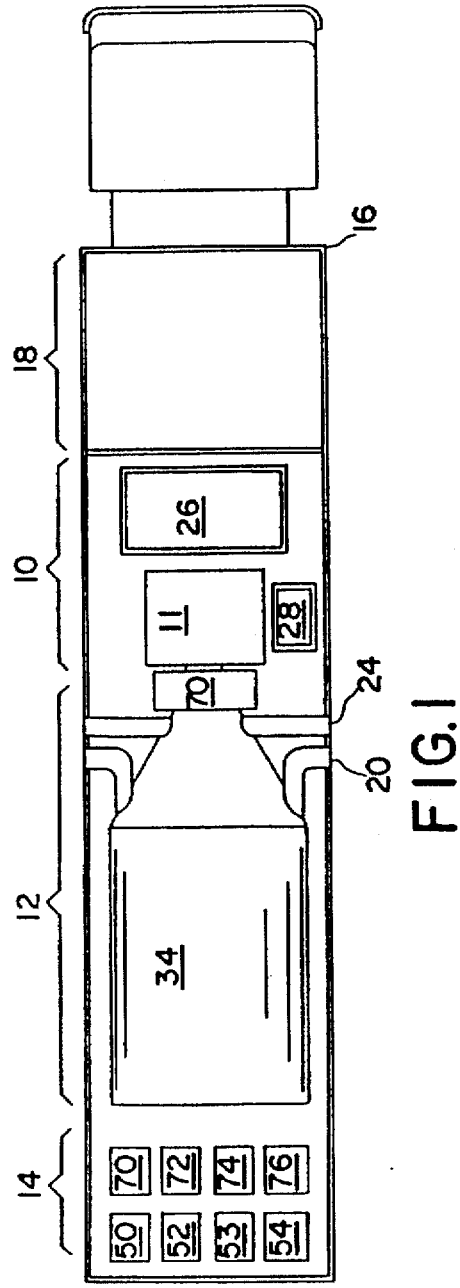
FIG. 1 is a plan view of an electron beam conversion (conversion, treatment, transformation and reaction are words used interchangeably to describe the plenum chamber and/or its operation in accordance with this invention) system according to the preferred embodiment of this invention.
Figure 2:
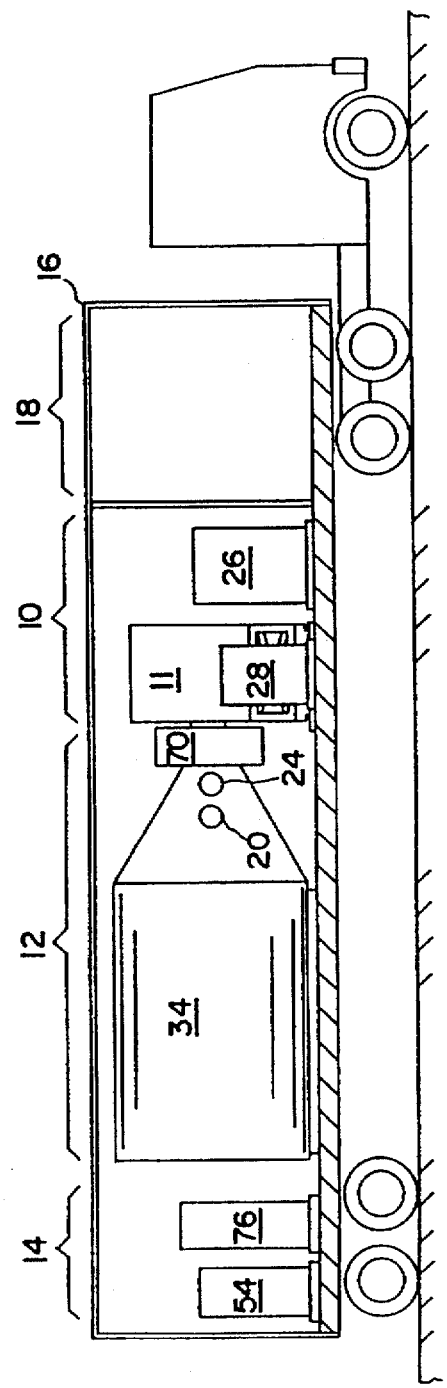
FIG. 2 is a side elevation view of the electron beam conversion system of FIG. 1.

FIGS. 1 and 2 show top and side views of a transportable electron beam conversion system according to this invention. An electron beam generator subsystem 10, a transformation subsystem 12, and influent pre-processing and effluent post-processing modules 14 are mounted in an enclosed trailer 16. The instrumentation and controls required to monitor and operate the system may be located in a control room 18 at one end of trailer 16. Control room 18 has suitable protection for its occupants from radiation and airborne hazards.

Influent (e.g., untreated material) enters the system through inlet pipes 20. Effluent from the transformation subsystem 12 and optional effluent post-processing modules 14 leaves the system through outlet stack 24. Thus, the entire toxic remediation system is contained in trailer 16. Performance and efficiency of the electron beam conversion system are dependent upon many interrelated factors, including the shape, dimensions, and total volume of the reaction chamber; the density and density distribution of the reaction chamber contents; and the characteristics of the electron beam, such as its cross-sectional dimensions, the pattern of directions of the incident electrons, the kinetic energies and energy distribution of the electrons, the peak and average power of the beam, and the dose rate. In addition, the system's performance may be enhanced by the generation of secondary electrons upon collision of electrons in the incident beam with the chamber and/or chamber contents.

In the preferred embodiment, electron beam generator subsystem 10 is a 2.5 MeV pulsed linear electron accelerator 11. This unit includes a high-vacuum cylindrical envelope which contains an electron gun comprising an electron source (heated cathode), accelerating electrode (anode), and a control electrode (grid). The electron gun injects electrons into an evacuated waveguide which includes a series of resonant cavities in which the electrons are accelerated sequentially, using energy derived from a pulsed microwave source. In the preferred embodiment, the microwave source is a magnetron. A modulator 26 contains pulse generating components. The subsystem also includes heat exchanger 28 for cooling some elements of the subsystem.

The preferred embodiment employs a microwave-pulsed linear electron accelerator to meet the size, power, and weight requirements of the transportable conversion system. Other electron beam sources may be used, however, without departing from the scope of this invention. For example, linear induction accelerators have been used in the laboratory with limited success and may be used in this application if the requirements for transportability and reliability are met. As another example, electron sources in which electron energy is determined solely by power supply voltage, without microwave or induction boost, can also be used if the transportability and reliability requirements are met. In the preferred embodiment, the average beam power may be made adjustable and the modulator may also be selected to permit modifications to adjust the peak beam power.

Figure 3:
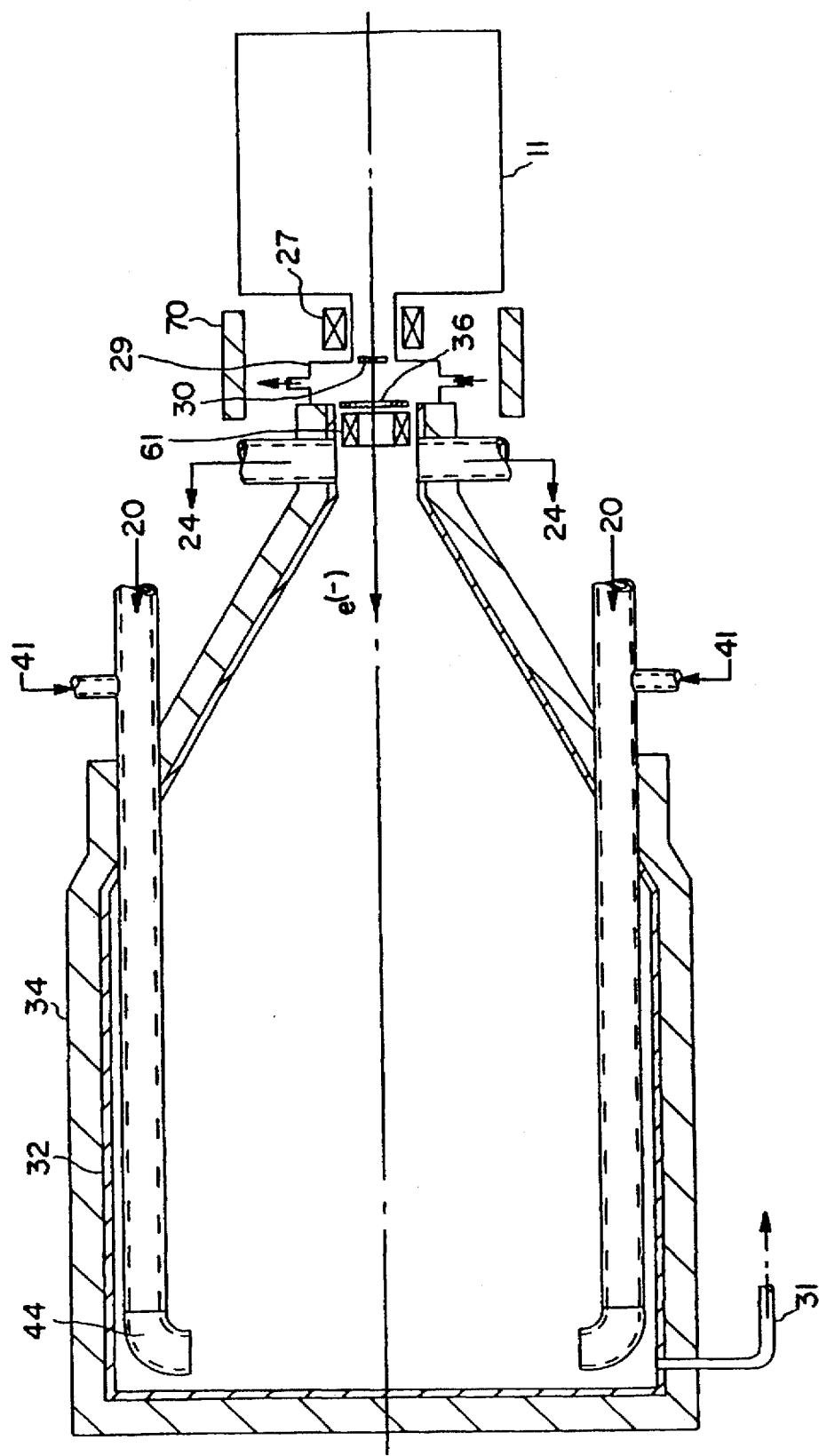
FIG. 3 is a schematic cross-sectional view of the reaction chamber subsystem and electron beam source of this invention.

FIG. 3 is a schematic cross-sectional view of transformation subsystem 12 as well as a portion of the electron beam generator subsystem 10, particularly the output end of accelerator 11. In order to maintain the interior of accelerator 11 under a high vacuum, an accelerator vacuum window 30 (preferably 1 to 2 mils titanium) is positioned at the accelerator outlet. Other materials may be used (such as stainless steel, beryllium or ceramics) and other material thicknesses may be used for window 30 without departing from the scope of this invention. The goal in selecting a material and thickness for window 30 is to provide a desired scatter angle (as discussed below) and low energy loss while still maintaining a vacuum and good thermal conductivity to reduce thermal stresses generated in the window by the electron beam. Thickness of window 30 will depend on the power and energy of the electron beam source, the density of the material chosen for the window, and mechanical stresses created in the window during operation of the system.

The effective electron beam diameter may be enlarged, for example by use of quadrapole coils 27, thereby reducing thermal stresses by distributing beam power over a larger area of the window. Window 30 may also be water cooled to prevent overheating. The electron beam from accelerator 11 travels through window 30 into a small chamber 29 before passing into the interior of transformation subsystem 12. Chamber 29 is purged by a non-reactive gas such as nitrogen to eliminate ozone produced by the interaction of electrons with oxygen and to aid in cooling the window.

Exposure of window 30 to the material in chamber 32 could threaten the integrity of the vacuum in accelerator 11, thereby adversely affecting system performance. In the preferred embodiment, therefore, a second window 36 is disposed between window 30 and the interior of chamber 32 to prevent any contact between material in chamber 32 and window 30. Window 36 may be formed from sapphire, mica, ceramic, or other material resistant to the acids that may be generated in the transformation process. The thickness of window 36 depends on, among other things, the material chosen and the operating pressure within chamber 32. In the preferred embodiment, window 36 is formed from 3 mil thick sapphire. In addition, chamber 29 is maintained at a pressure greater than the reaction chamber pressure to inhibit backflow of material from the reaction chamber toward window 30 in case of breach or failure of window 36.

In an alternative embodiment, window 36 is omitted and noncontaminated flowing gas (such as air) is used to prevent contact between the reaction chamber contents and window 30.

Radiation shielding reduces to safe levels the emission of Xrays or other radiation generated by collisions of electrons with materials in their paths. For example, shield 70 surrounds the outlet nozzle of the accelerator. Shielding may be formed from steel, concrete, lead, or any other suitable material. Other shielding is placed around the system as needed to meet with regulatory requirements and to permit it to be safely operated in the presence of people.

Transformation subsystem 12 includes a self-shielded, chemically resistant transformation plenum comprising a reaction chamber 32 of nonmetallic material such as porcelain, polyethylene, polyurethane, or resin-impregnated fiberglass surrounded by an exterior shell 34 of shielding material such as steel. The material chosen for the reaction chamber depends on the application, but in any event should preferably minimize the creation of Xrays resulting from collisions with impinging electrons. Alternatively, the reaction chamber may be of steel or Inconel of sufficient shielding thickness or other metals if it is determined based on what is being processed that corrosion is not a likely problem. The purpose of shell 34 is to reduce to safe levels any Xrays generated by interaction of the electron beam with system components and contents of the reaction chamber. Shell 34 may also be formed from concrete, lead, or any shielding substance known in the art.

Chamber 32 may be formed by depositing a lining material on the interior surface of shell 34. Alternatively, chamber 32 may be removable from shell 34 for replacement of a reaction chamber with a new one made from the same material or, if the system is being reconfigured, with a chamber made from a different material adapted to the system's next application. In the preferred embodiment, chamber 32 and shell 34 are formed as separate elements. Suitable doors or ports are provided in chamber 32 and shell 34, respectively, to provide access to change chamber 32 from time to time and for cleaning and other maintenance.

The shape of reaction chamber 32 optimizes system performance while minimizing the size and weight of chamber 32 and its shield 34. Windows 30 and 36 will cause the electron beam to scatter in varying degrees depending on the window material and thickness. In the preferred embodiment, therefore, reaction chamber 32 is narrow at the electron beam inlet and tapers outwardly to approximate the angle of beam divergence. This reduces the likelihood that untreated materials will bypass the electron beam. In the preferred embodiment, chamber 32 is conical with its narrow diameter at the electron beam inlet.

A cylindrical portion may be added at the larger end of the conical chamber to provide additional path length for the electron beam. Chamber 32 may also be made with a square or polygonal cross-section or of gradually increasing proportion, and may lead to a constant width portion at the large end. Length of reaction chamber 32 is determined by the effective penetration of the scattered electron beam, which, in turn, is determined by the energy of the electrons in the beam and the nature and density of the material within the chamber.

If one doubles the chamber pressure, density within the chamber is doubled and this reduces the electron beam path to about half of what was previously needed to accomplish transformation with the same efficiency, thereby approximately halving the required reaction chamber length. Of course, in such a case the chamber and associated elements will have to be structured to handle the increased pressure.

Thus, the size and shape of the reaction chamber, the material and thickness of the windows, the pressure, temperature, mass flow rate and composition of the treated material, the power of the electron beam source, and the energy of the electrons in the beam are interdependent design parameters which may be altered to fit a particular application.

The preferred embodiment is designed to accommodate a continuous flow of treatable material through the system. Reaction chamber 32 is therefore designed to optimize contact between the electron beam and the flow stream. Influent from a source such as a vacuum extraction system, an air stripping system, an incinerator, a rotary kiln, a bioreactor or an industrial process and like systems enters reaction chamber 32 through inlets 20. Elbows 44 on the ends of inlet ducts 20 direct the influent initially into a swirling flow around the end of the chamber farthest from the electron beam source. The interaction of swirling influent with inlet ducts 20 and other baffles (not shown) within chamber 32 creates a turbulent flow swirling through the chamber. Exit ports 24 are located adjacent to window 36 at the small end of the chamber's cone. The turbulent flow of material from the far end of the chamber toward the electron beam source maximizes interaction between the electron beam and the flowing material, thereby maximizing overall system efficiency. Additional inlets 41 may be used to add catalysts and/or water to the reaction chamber to aid in the transformation process. Alternatively, the inlet ducts may be placed at other locations, such as at the bottom of the reaction chamber, without departing from the scope of the invention. In a like sense the outlet ducts also may be placed at different locations without departing from the spirit of this invention.

Figure 4:
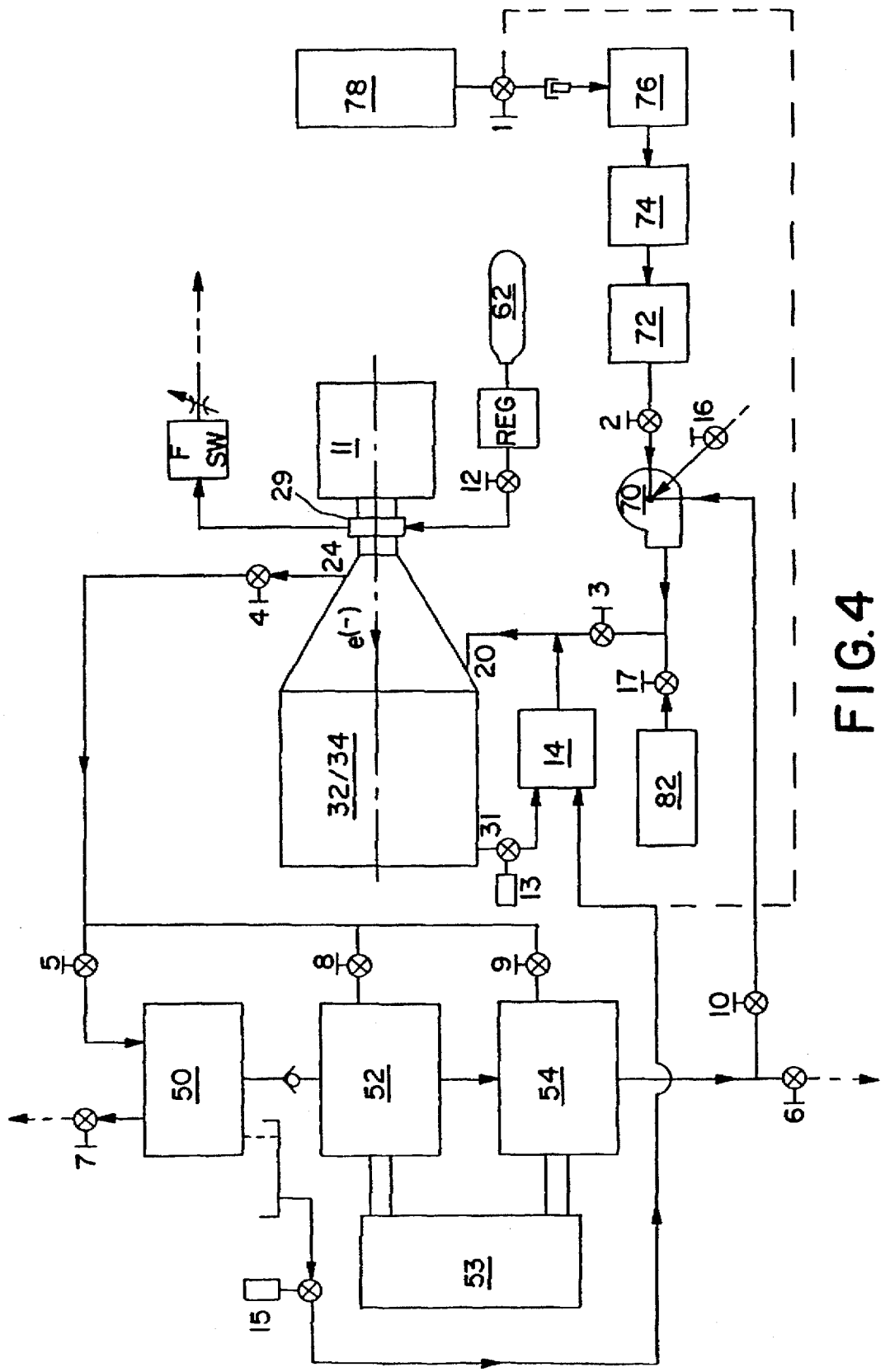
FIG. 4 is a schematic process flow chart showing the electron beam conversion system of this invention.

As shown in FIG. 4, the system can also be used in a batch mode wherein the reaction chamber is filled with untreated material, valves 3 and 4 are closed, and the trapped material is treated with the electron beam to transform the contents to other elements and compounds. This "batch" of treated material is thereafter evacuated to the effluent post-processing modules (if post-processing is required) before release.

FIG. 4 is a process flow diagram which shows a possible configuration of influent preprocessing and effluent postprocessing modules. Untreated material from source 78 driven by pump 70, enters filter system 76, moisture trap 74, and thermal device 76, before entering reaction chamber 32 via inlets 20 (FIG. 3). It is noted that pump 70 may be positioned on the otherside of plenum or reaction chamber 32. This path or an alternate selected by the operator may be followed depending on the objectives and needs at a particular site. These elements are used to provide influent preprocessing as needed to maintain and optimize the conversion process. If the influent material is not a gas, influent may be directed through atomizer 14 prior to entering reaction chamber 32. A reagent may be added from reagent source 82 to enhance chemical reactions.

Treated material from reaction chamber 32 may be directed via ports 24 to a conventional scrubber system 50 to post-process any acids formed during the transformation process. The scrubbed material may then be directed to vessels 52 and/or 54 containing conventional adsorption materials (such as activated carbon in granular form) to trap any residual undesired material and to serve as a backup system in the event that the electron beam is deactivated prematurely. An inert gas such as nitrogen from a source 62 may be used to purge chamber 29.

With an interest in providing a full disclosure of different ways of operating the system of this invention, various conditions and the operating parameters will now be described.

A. Continuous Flow from Source; Treatment of Effluent with Caustic Scrubber and Granular Activated Carbon Close valves 7, 8, 9, 10, and 17.
 Open valves 1, 2, 3, 4, 5, 6, and 12.
 Start E-Beam.
 Start Pump 70.

B. Continuous Flow plus Catalyst and Treatment of Effluent (as in A)

All valves set as in A above.
 Open valve 17.
 Start E-Beam.
 Start Pump 70.

C. Continuous Flow plus Condensate from Plenum Plus Treatment of Effluent (as in A)

All valves set as in A.
 Liquid Level Sensor opens valve 13 and starts Pump/Atomizer 14.
 Start E-Beam.
 Start Pump 70.

D. Continuous Flow Plus Condensate from Scrubber 50 Plus Treatment of Effluent (as in A)

All valves set as in A.

Liquid Level Sensor Opens valve 15 and starts Pump/Atomizer 14.

Start E-Beam.

Start Pump 70.

E. Batch Processing with Effluent Treatment

Close valves 4, 7, 8, 9, 10, 16, and 17.

Open valves 1, 2, 3, 5, 6.

Start Pump 70.

Close valve 3 and stop Pump 70 when desired pressure reached inside the plenum.

Begin E-Beam. Run required Total Electron Dose.

Open valve 4.

Close valve 2.

Open air valve 16.

Start Pump 70.

F. Supply toxics are liquid, with Treatment as in A

Connect source line to Pump/Atomizer 14.

Close valves 1, 2, 8, 9, 10, 13, 17.

Open valves 3, 4, 5, 6, and 16.

Start E-Beam.

Start Pump 70.

Start Pump/Atomizer 14.

G. Only Scrubber 50, No Carbon, with Effluent Treatment as in A

Close valves 6, 8, 9, 10, 13, 16, and 17.

Open valves 1, 2, 3, 4, 5, 7.

Start E-Beam.

Start Pump 70.

H. Only Carbon (52 and/or 54), No Scrubber 50

Close valves 5, 10, 16, and 17.

Open valves 1, 2, 3, 4, 5, 6, 8, and/or 9.

Start E-Beam.

Start Pump 70.

These examples, which should be understood are exemplary only and not inclusive, are intended to give an understanding of the flexibility of the system of this invention.

In addition, provision may be made to remove or treat (if desired) any sludge or condensate that may form in reaction chamber 32. Valve 13 and sump drain line 31 will drain condensate and sludge from a sump or collector in the chamber and into the inlet gas stream via atomizer 14. Effluent from scrubber 50 may be treated in the same way.

Influent and effluent gases may be monitored on-line by flow sensors and chemical analysis sensors to determine the composition, temperature, and pressure of input and output material. Operation of the electron beam source may also be monitored by measuring the electron beam current using a current detector torroid 61 surrounding the output beam. Analytical instruments and monitoring equipment may be located in equipment room 18 along with system controls. Computers and computer software may be used in system control. Provision may also be made to control the entire system from a remote location.

The transportable electron beam conversion system of this invention runs on AC power. If there is no suitable power supply at the conversion site, an AC power generator may be added onto the transport mechanism as to provide total independence to the system.

No two toxic waste sites are the same. Each site has different contaminants in varying amounts. In addition, requirements to clean up a given site can change over time.

The electron beam system of this invention is therefore designed to be both transportable from site to site and reconfigurable to meet the requirements of a particular site. System components are removably attached (such as by bolting) to the floor of the trailer. Thus, one reaction chamber can easily be removed and replaced with another of a different size or configuration; an electron beam source can be exchanged for another with lower or higher energy outputs; scrubbers and adsorption vessels can removed or supplemented.

Provision may also be made to protect the system components during transport. For example, in the preferred embodiment the mounting slides for the electron beam source permit the accelerator to be anchored away from the reaction chamber during transport, then moved and correctly aligned into position prior to use at clean-up sites. This feature also contributes to easy maintenance of the electron beam source.

In the preferred embodiment, the transformation process takes place at near ambient temperature. As an alternative, material in the reaction chamber may be at an elevated temperature, which in general increases the reaction rates of chemical processes. If the material source is a granular carbon regeneration system, for example, material driven off the adsorbent carbon may be at a high temperature. The transformation system may also itself include means to change influent and/or reaction chamber temperature and/or pressure such as a heater, or a cooler, to help regulate the temperature of the transformation process, or a pump and controls to regulate the pressure of the plenum.

This invention may be used in applications other than toxic waste conversion, such as a step in an industrial process. Other modifications covered by this invention will be apparent to those skilled in the art.

We claim:

1. A treatment system for the transformation of organic compounds in liquid into environmentally more acceptable chemicals comprising an atomizer, means to flow organic compounds in liquid for treatment into said atomizer for atomization therein, means to feed the output from said atomizer into a treatment chamber, an electron generator to output electrons into said treatment chamber to interact with said atomized output and cause chemical transformations of organic compounds therein, and means to release the treated chemicals from said chamber.

2. A treatment system in accordance with claim 1 including at least one preprocessing station between said atomizer and said treatment chamber.

3. A treatment system in accordance with claim 1 including means to reconfigure the system with preprocessing stations in the flow path before said treatment chamber.

4. A treatment system in accordance with claim 1 including at least one post processing station in line after said treatment chamber.

5. A treatment system in accordance with claim 1 including means to reconfigure post processing stations in the flow path after the treatment chamber.

6. A treatment system in accordance with claim 1 including means to flow the effluent of the system after the treatment chamber in a path to return the effluent to the input side of the treatment chamber for passage again through the treatment chamber for further processing.

7. A treatment system for the transformation of organic compounds in a sludge into environmentally more acceptable chemicals comprising an atomizer, means to flow a sludge for treatment into said atomizer for atomization therein, means to feed the output from said atomizer into a treatment chamber, an electron generator to output energetic electrons into said treatment chamber to interact with said atomized sludge to cause chemical transformations of organic compounds therein, and means to release the treated chemicals from said chamber.

8. A treatment system in accordance with claim 7 in which means are provided to drain sludge from said treatment chamber and feed said drained sludge to said atomizer.

9. A treatment system for the transformation of organic compounds in a solid into environmentally more acceptable chemicals comprising an atomizer, means to flow solid materials for treatment into said atomizer for atomization therein, means to feed the output from said atomizer in a gas stream into a treatment chamber, an electron generator to output energetic electrons into said treatment chamber to interact with said atomized materials to cause chemical transformations of organic compounds therein, and means to release the treated chemicals from said chamber.

10. A treatment system for the transformation of organic compounds in the output of a scrubber into environmentally more acceptable chemicals comprising an atomizer, means to flow materials for treatment from said scrubber into said atomizer for atomization therein, means to feed the output from said atomizer in a gas stream into a treatment chamber, an electron generator to output energetic electrons into said treatment chamber to interact with said atomized materials to cause chemical transformations of organic compounds therein, and means to release the treated chemicals from said chamber.

11. A batch treatment system for the transformation of volatile organic compounds into environmentally more acceptable chemicals comprising means to fill and then seal a reaction chamber with a gaseous mixture to be treated, an electron generator to output electrons into said reaction chamber to interact with said trapped gaseous mixture to cause chemical transformations of organic compounds therein, and means to subsequently open an output path from said reaction chamber and to flow the treated materials therefrom.

12. An electron beam system for the conversion of organic compounds comprising:

an electron beam source;

a reaction chamber;

an electron permeable window at the output end of said electron beam source;

means to distribute the beam power of said electron beam over a broad area of the window reducing thermal stresses at said window caused by a more condensed beam; and, control means to configure the flow paths of pre and post processing stations on each side of said reaction chamber, selected to operate within said conversion system, and to set operating parameters of said system.

13. An electron beam system for the conversion of organic compounds comprising:

an electron beam source;

a reaction chamber;

an electron permeable window at the output end of said electron beam source;

a curtain of flowing gas to separate said window from the contents of said reaction chamber; and, control means to configure the flow paths of pre and post processing stations on each side of said reaction chamber, selected to operate within said conversion system, and to set operating parameters of said system.

14. An electron beam system in accordance with claim 3 in which said gas of said curtain is thereafter directed to said reaction chamber for treatment.

15. The method of treating undesirable organic compounds in a liquid state comprising flowing said liquid to be treated to an atomizer, atomizing said liquid at said atomizer to a mist-like form, feeding said mist-like output into a reaction chamber, feeding electrons from an electron source to said reaction chamber to interact with said mist-like output in said reaction chamber causing transformations of said organic compounds into environmentally more acceptable chemicals, and transferring the output from said reaction chamber.

16. The method of treating undesirable organic compounds in a gaseous state comprising flowing said gas including said compounds to be treated into a reaction chamber, applying electrons from an electron source to said reaction chamber to interact electrons with said gas in said reaction chamber transforming said organic compounds to environmentally more acceptable chemicals, adjusting the beam power of the electrons applied to said gas in said reaction chamber for efficient application of electrons to said gas to be treated, and transferring the treated gas out of said reaction chamber.

17. Treatment apparatus to refresh a carbon containment system comprising a reaction chamber, means to connect a containment canister having adsorbed contaminant organic compounds to a reaction chamber, means to release said adsorbed contaminants to said reaction chamber, an electron generator to output energetic electrons to said reaction chamber to facilitate interactions between said electrons and said released contaminant organic compounds in said reaction chamber, and means to transfer the treated chemicals out of said reaction chamber.

18. A treatment system in accordance with claim 17 including means to create turbulent flow in said treatment chamber.

* * * * *